ns Patent Office 2,862,598
Patented Dec. 2, 1958

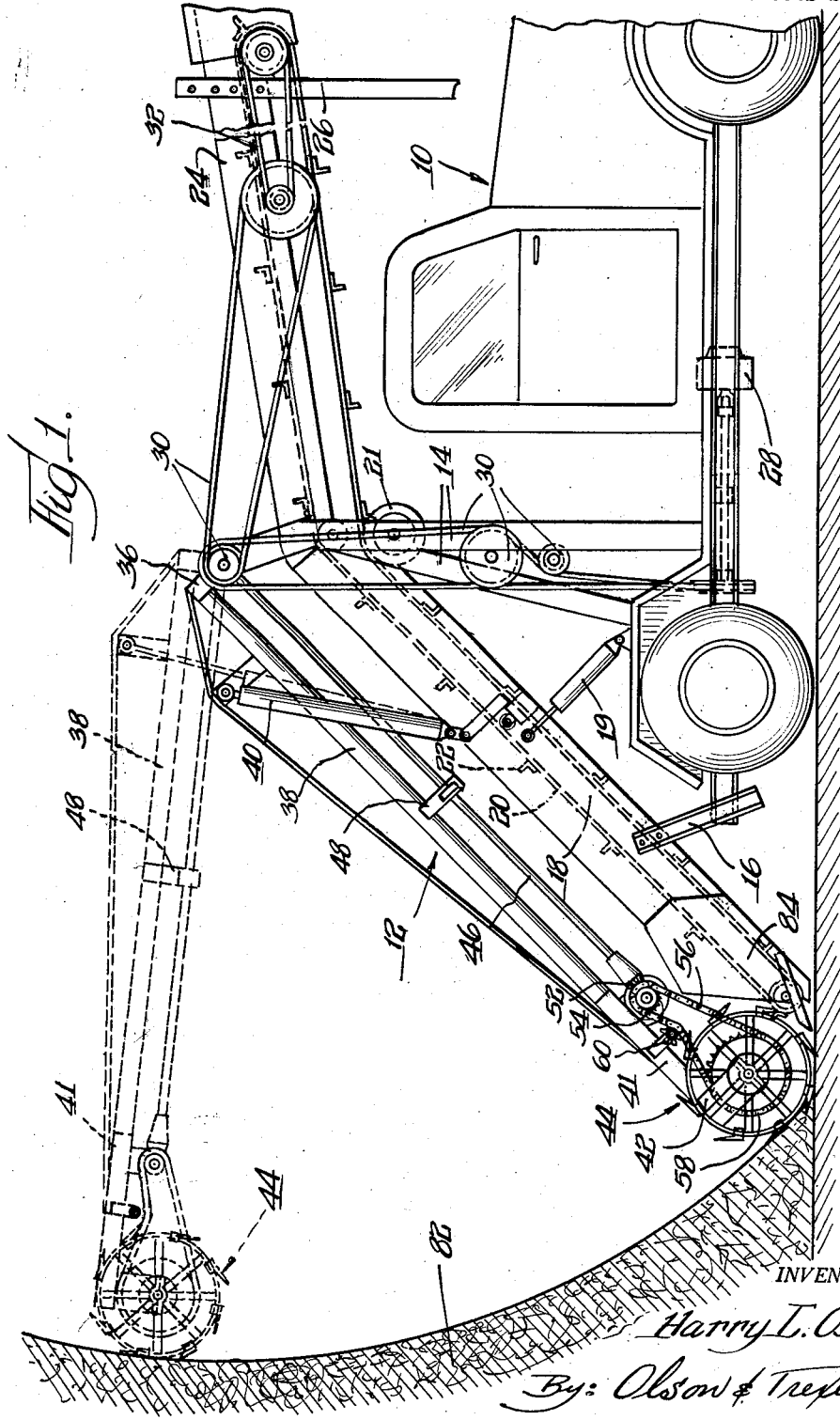

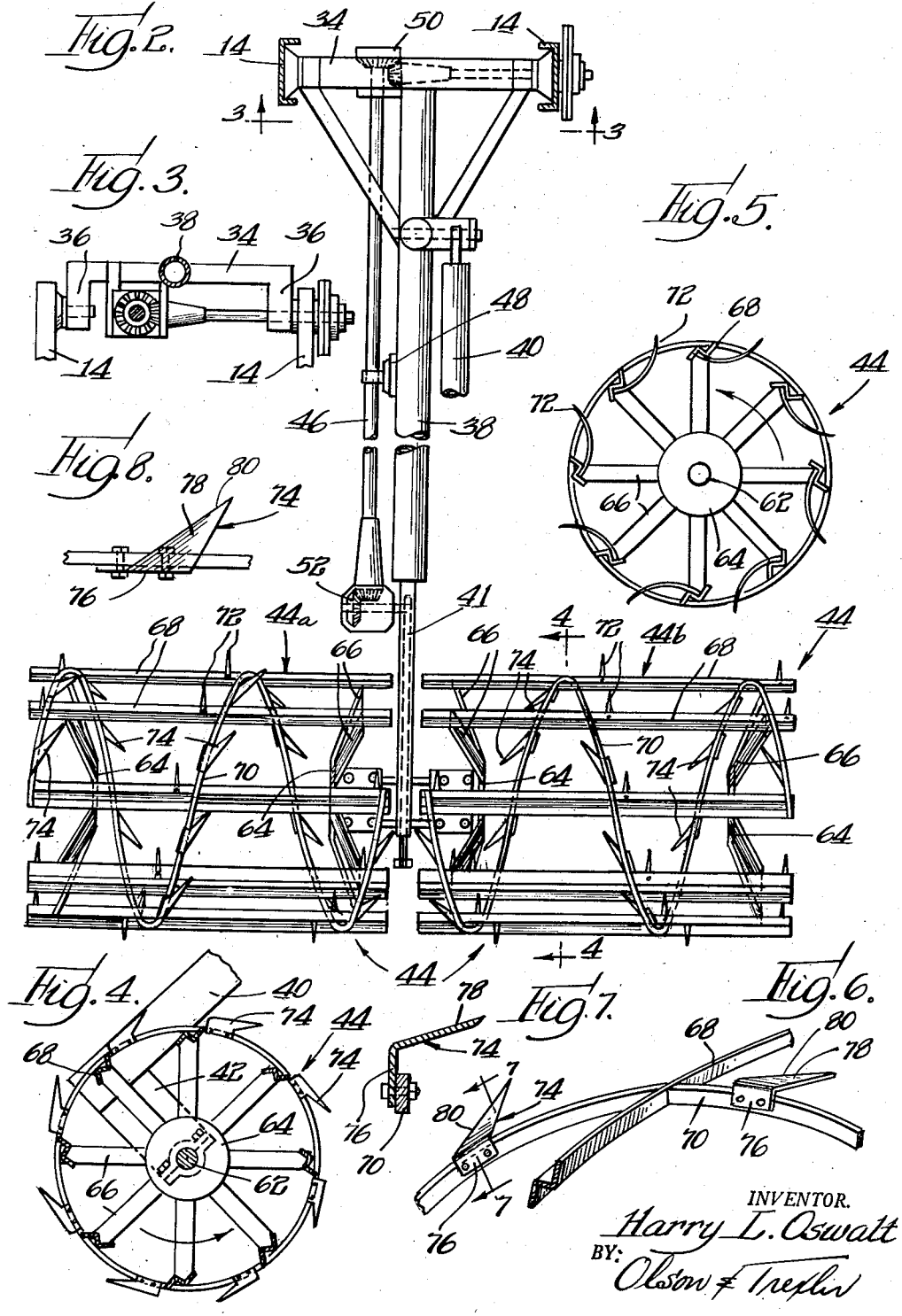

2,862,598

ENSILAGE LOADER

Harry L. Oswalt, Garden City, Kans.

Application November 4, 1955, Serial No. 544,933

11 Claims. (Cl. 198—9)

This invention relates to a novel mechanical loading apparatus, and more particularly to a novel apparatus for loading material, such as ensilage and the like.

In many instances, where large quantities of stock feed must be stored, crops such as corn, alfalfa, grass, sorghums, and the like are chopped when green and are deposited in trenches formed in the earth to ensile. Often hay of considerable length, and vine plants such as pea vines are deposited in this manner. The ensilage is stored in this manner for considerable periods of time, and is periodically removed for stock feeding purposes. In the past, removal of portions of ensilage from the storage pile has been relatively difficult, since after the ensilage has been stored it becomes thoroughly matted and interlocked.

In my prior application, Serial No. 343,569, filed March 20, 1953, and entitled "Ensilage Loader," now Patent No. 2,724,481, there is disclosed and claimed a novel apparatus for loading ensilage. The ensilage loader therein disclosed does not require the considerable power required by apparatus previously attempted, it does not shred the pile of ensilage leaving loose and dangerous portions thereof, and the ensilage does not become entangled with the loader. In general, the loader of my prior application utilizes a reel having rearwardly leaning blades or paddles. These blades or paddles do not dig into the ensilage in the manner attempted prior to my invention, but on the contrary they compress the ensilage. As each succeeding blade or paddle compresses the ensilage, and then moves past the ensilage, the inherent resilience of the compressed ensilage causes it to spring or pop into the air where it is engaged by the next succeeding blade or paddle for displacement from the pile onto a conveyor mechanism.

It is an object of this invention to provide improvements over my aforesaid ensilage loader.

More specifically, it is an object of this invention to provide a reel for loading ensilage and having means thereon for cutting long ensilage such as pea vines and long hay, whereby positively to preclude any tendency of the ensilage to shred or to tangle up with the reel.

More specifically, it is an object of this invention to provide an ensilage loading reel having cutting blades thereon angled rearwardly relative to the direction of rotation of the reel for cutting the ensilage without becoming entangled therewith.

Other objects of this invention include the provision of an ensilage loading reel which is simple and economical to fabricate, and which is of rigid and rugged construction.

Other and further objects and advantages of the present invention will be apparent from the following description when taken in connection with the accompanying drawings wherein:

Fig. 1 is a side view of an ensilage loader embodying the principles of my invention;

Fig. 2 is a top view of the novel reel and the boom carrying the same, and forming the inventive portion of the loader herein disclosed;

Fig. 3 is a vertical section view taken substantially along the line 3—3 of Fig. 2;

Fig. 4 is a sectional view of the reel as taken substantially along the line 4—4 in Fig. 2;

Fig. 5 is an end view of the reel;

Fig. 6 is a perspective view of a portion of the reel showing the attachment of the helical band to the blades or paddles, and the attachment of the cutters to the band;

Fig. 7 is a sectional view through a cutter as taken substantially along the line 7—7 in Fig. 6; and Fig. 8 is a top view of one of the cutters.

Referring now in greater particularity to the drawings, and first to Fig. 1, there is shown a truck 10 having the ensilage loader 12 mounted on the bed thereof. The ensilage loader is supported in part by a frame 14 of generally triangular shape on each side of the bed, and a pair of channel members 16 are mounted on the lower end of a conveyor mechanism 18, the upper end being supported by the frame 14. The channel members slide past the truck bed and provide lateral stability for the conveyor mechanism as it is raised or lowered by a hydraulic jack 19. The conveyor mechanism includes an endless belt 20 having cleats 22 thereon for raising the ensilage to be loaded. In addition, there is an extension 24 of the conveyor supported by uprights 26 at the front part of the truck for carrying the ensilage forward of the truck. This extension conveyor also includes an extension of the flexible belt angled forwardly over suitable rubber tired rollers, the cleats 22 being made in sections so as to pass the rollers 21. The belt or belts are driven by a power takeoff 28 on the truck and operating through suitable belts and pulleys 30, and a link chain 32.

The upright members 14 comprise channel members facing one another, and as will be seen in Fig. 2 there is a pivotally mounted cross member 34 extending between them. An upstanding support 36 (Fig. 1) at either end of the cross member 34 (see also Fig. 3) provides support for the cross member 34 and is pivotally supported from the adjacent upright member 14, whereby the cross member 34 is eccentrically pivotable. A tubular boom 38 is supported from the cross member 34, and hydraulic mechanism including a piston and cylinder 40 provides for raising and lowering the boom, such as between the solid line position and the dashed line position of Fig. 1. The outer end of the boom is flattened as at 41 for reasons which hereinafter will appear, and a depending part 42 thereon supports a reel 44 forming the subject matter of this invention.

A longitudinal drive shaft 46 is rotatably supported from the boom by means such as brackets 48. The drive shaft 46 is shown as being positioned to one side of and below the boom, but it is to be understood that it could be directly below the boom, and it is within the contemplation of the invention that the drive shaft might be mounted within the boom. In any event, the drive shaft is driven by bevel gearing 50 (Fig. 2) from a cross shaft driven by one of the pulleys of the drive mechanism 30 previously referred to. At the lower end of the drive shaft 46 further bevel gearing 52 drives a sprocket 54 (Fig. 1). The sprocket in turn drives an endless belt 56 which drives a large sprocket 58 connected to the reel for driving the reel. An idler sprocket 60 maintains proper tension on the link belt. It will be understood that other driving means could be used. For instance, the drive shaft 46 could be extended and could operate through bevel gears or the like directly to drive the reel without the intermediary of the link belt 56.

The reel 44 comprises a shaft or axle 62 driven by the sprocket 58 and rotatably supported by portions of the depending part or bracket 42. The reel, aside from the shaft or axle, is discontinuous at its center portion to provide clearance for the driving mechanism such as the link belt or chain 56 and the sprocket 58. On either side of the central discontinuity, the reel comprises a pair of spaced discs 64 of relatively small size. A plurality of spokes 66 extends generally radially outwardly from the discs 64. The spokes are welded or otherwise suitably affixed to the discs, and form a generally frustoconical pattern.

Blades or paddles 68 are welded to the outer ends of the spokes. The blades or paddles extend parallel to the shaft or axle 62, and each of the blades or paddles is of generally Z-shaped cross section. The Z-shaped blades or paddles provide a very rigid reel structure. An important feature of the invention is that the blades or paddles lean backwardly relative to the direction of rotation of the reel. In other words, the blades are so oriented that inner portions of the blades lead outer portions thereof in rotation. As explained in my co-pending application previously referred to, this prevents the blades from digging into the ensilage and becoming entangled therewith. The blades press down on the ensilage, and as each blade leaves a section of compressed ensilage, the inherent resiliency of the ensilage causes it to spring into the air where it is displaced by the next succeeding blade to fall down onto the conveyor mechanism 18.

As previously has been alluded to, and as will be obvious in the drawings, the blades or paddles 68 are interrupted at the center of the reel. Thus, the reel might be considered to constitute a pair of reel sections 44a and 44b. In addition to the parts previously described, each reel section is provided with a helical band 70 wound about the blades 68. Each band comprises a flat steel bar, and has an outer surface flush with the outer edge of each blade 68. Conveniently the bands are joined to the blades by forming slots in the outer edges of the blades into which the bands are inserted, the bands then being welded to the blades. In addition to the setting of the bands into slots in the blades, it will be apparent that the bands engage the apices of the blades, and welding at this point also provides an extremely rigid structure. The bands are provided to prevent bobbing or vibrating of the reel up and down. They do this by providing continuous contact with the surface of the ensilage to support the weight of the reel, whereas it will be apparent that without the bands there would be no support for the reel from the time one blade left the pile of ensilage until the next blade engaged the pile. Furthermore, the blades, being helically arranged, are disposed relative to the direction of rotation so as to tend to feed the ensilage in toward the center of the reel, thereby facilitating disposition of the ensilage on the conveyor or elevator 18.

A plurality of spring tongues is spaced helically about the reel section, generally in the same pattern as the bands, but axially displaced therefrom. These tongues, hereinafter identified by the numeral 72, are triangular in outline, having pointed outer tips, and are curved when viewed from the end of the reel as in Fig. 5. The tongues conveniently are fastened by rivets, or by any other suitable means, to the webs of these Z-shaped blades, and project outwardly a short distance behind the blades. The spring tongues trail the blades in the direction of rotation so that there is no tendency for them to dig into the ensilage and to become entangled therewith. Their function is to augment the inherent springing action of the compressed ensilage to displace the ensilage from a pile thereof.

The reel is completed by a plurality of more or less triangular shaped cutters 74. The cutters, as best may be seen in Figs. 4 and 6–8, comprise flanges 76 bolted, riveted, or otherwise suitably secured against the sides of the bands 70, and further comprise angularly disposed blades 78 which extend outwardly at a shallow angle above the bands, and approach parallelism with the blades 68, but oriented in a trailing manner so as to avoid entanglement with the ensilage. The leading edges 80 of the blades are sharpened. The cutters are particularly efficacious in cutting up long hay silage and pea vine silage, and other silage of long stock, into useful lengths which readily can be handled without any tendency to become entangled with the reel.

Operation of the ensilage loader will be seen with regard to Fig. 1. The boom 38 and reel 44 are raised by the hydraulic mechanism including the piston and cylinder 40 to the top of a pile of ensilage 82. The reel is brought into engagement with the pile of ensilage by backing the truck slightly, and the boom and reel then are hydraulically lowered. The sharpened cutters 74 cut up any long lengths of ensilage into shorter lengths which can be handled efficiently, and the succeeding blades 68 compress the silage, and then knock the compressed silage from the pile as it springs out following compression by a blade. The falling silage is received by the elevator or conveyor mechanism 18, which carries the same forwardly for deposit in a truck or wagon (not shown) positioned in front of the truck 10. The helical bands 70 prevent the reel from vibrating or bobbing up and down, and help to feed ensilage toward the center where it more readily is picked up by the conveyor or elevator. Furthermore, the bands help to provide an extremely rigid structure, and the rigidity is further enhanced by the Z-shape of the blades 68. The lower portion of the conveyor or elevator 18 is formed as a bulldozer 84 to facilitate loading of loose material onto the conveyor or elevator, simply by backing the truck against the loose material.

The reel as herein shown and described displaces ensilage from a pile with a minimum of power. The ensilage, even long stock such as long hay and pea vines, does not become entangled with the reel. A firm and well defined "cut" is made by the reel so that there are no jagged or loose edges on the pile. It will be appreciated that such jagged or loose edges would allow air to get at the ensilage, and this would cause the ensilage to deteriorate. Furthermore, it is sometimes necessary to walk on top of a pile of ensilage, and loose or ragged edges can be quite dangerous as the pile readily could give way beneath a man walking near the edge thereof.

It is to be understood that the specific example of the invention as herein shown and described is for exemplary purposes only. Various changes in structure will no doubt occur to those skilled in the art, and are to be understood as forming a part of the invention insofar as they fall within the spirit and scope of the appended claims.

The invention is claimed as follows:

1. In an apparatus for loading material, such as ensilage and the like, the combination comprising rotatable means for removing said material from a storage pile thereof, said rotatable means being of generally elongated cylindrical construction and comprising a plurality of blades extending generally longitudinally of the rotatable means substantially at the circumference thereof, and a plurality of cutters spaced about said rotatable means, said cutters having cutting edges arranged generally diagonally of the direction of movement of the adjacent parts of the rotatable means, leading portions of said cutters being closer to the axis of rotation of said rotatable means than outer portions of said cutters are to said axis.

2. In an apparatus for loading material such as ensilage and the like, a reel comprising a plurality of substantially longitudinally extending blades engageable with the material, helical band means wrapped around said blades and forming a support for said reel on said material between said blades, and a plurality of cutters mounted on said band means and adapted to cut said material.

3. The combination as set forth in claim 2 wherein each cutter comprises a flange affixed to said helical band means and a cutting blade extending therefrom, said cutting blade having a cutting edge arranged diagonally relative to the direction of movement thereof, the portion of each cutting blade nearest the flange being positioned radially inwardly of the free end of the cutting blade and leading said free end in the direction of rotation.

4. The combination as set forth in claim 3 and further including a plurality of spring tongues mounted on the first mentioned blades and extending outwardly therefrom and rearwardly relative to the direction of rotation of said reel.

5. In an apparatus for loading material, such as ensilage and the like, the combination comprising a reel having a plurality of peripherally spaced blades parallel to the axis of rotation of the reel and successively engageable with such material for dislodging the same from a pile thereof, helical band means substantially encircling said blades and forming a support for said reel between said blades, and a plurality of cutters mounted on said band means for cutting said material.

6. The combination as set forth in claim 5 wherein the blades are of substantially Z-shaped cross section.

7. A rotary device for use in ensilage loaders and the like adapted for rotation in a given direction for displacing ensilage and the like from a pile thereof, comprising a plurality of pressure applying means engageable with the ensilage pile for compressing the surface of said pile so that as said means disengages from the pile upon rotation of said rotary device the inherent resiliency of the ensilage causes the compressed ensilage to spring outwardly from said surface for engagement with a following pressure applying means for sweeping said outwardly sprung ensilage from the pile, and a plurality of cutters spaced about said rotary device for cutting ensilage in said pile.

8. A rotary device as set forth in claim 7 wherein radially outward portions of said cutters trail radially inward portions thereof upon rotation in said given direction.

9. In an apparatus for loading material, such as ensilage and the like, a reel comprising a plurality of peripherally spaced blades substantially parallel to the axis of rotation of said reel, said blades being successively engageable with a storage pile of such material for removing said material therefrom, each blade having the inner edge thereof leading the outer edge in the direction of rotation of said reel and disposed at an angle of not more than ninety degrees to the corresponding radius of the reel so that the outer portions of the blades engage the material behind inner portions thereof.

10. A reel as set forth in claim 9 wherein the blades are substantially Z-shaped in cross section, having a pair of flanges and an interconnecting web, one of said flanges extending generally outwardly from said web, and the other extending generally inwardly from said web relative to said reel, the outwardly extending flange trailing the inwardly extending flange in the direction of rotation of said reel.

11. A reel as set forth in claim 10 and further including helical band means substantially wrapped about said blades, and a plurality of cutters spaced along said band means, each of said cutters including a base affixed to said band means and a triangular portion extending outwardly therefrom and having a free end, each triangular portion having a cutting edge, the cutting edge adjacent the base being positioned radially inwardly of the cutting edge adjacent the free end, and leading the cutting edge adjacent the free end in the direction of rotation of said reel.

References Cited in the file of this patent

UNITED STATES PATENTS

| | | |
|---|---|---|
| 2,719,058 | Van Dusen | Sept. 27, 1955 |

FOREIGN PATENTS

| | | |
|---|---|---|
| 44,205 | Sweden | June 26, 1918 |
| 142,897 | Sweden | Nov. 10, 1953 |